United States Patent [19]

Van der Meer et al.

[11] 4,163,045
[45] Jul. 31, 1979

[54] PROCESS FOR PRODUCING HYDROGEN FLUORIDE FROM AN AQUEOUS SOLUTION OF HYDROGEN FLUORIDE AND SULFURIC ACID

[75] Inventors: Arie Van der Meer, Helsinki; Lauri A. Lepomaa, Espoo, both of Finland

[73] Assignee: Kemira OY, Helsinki, Finland

[21] Appl. No.: 860,971

[22] Filed: Dec. 15, 1977

[30] Foreign Application Priority Data

Dec. 27, 1976 [FI] Finland ................................. 763707
Dec. 27, 1976 [FI] Finland ................................. 763708

[51] Int. Cl.$^2$ ............................................. C01B 7/22
[52] U.S. Cl. ..................................... 423/483; 423/488
[58] Field of Search ....................... 423/483, 484, 488

[56] References Cited

U.S. PATENT DOCUMENTS 3,455,650   7/1969   Conte et al. ........................... 423/483

FOREIGN PATENT DOCUMENTS 41-4700   3/1966   Japan.

Primary Examiner—Earl C. Thomas
Attorney, Agent, or Firm—Bucknam and Archer

[57] ABSTRACT

A process for producing hydrogen fluoride from an aqueous solution of hydrogen fluoride and sulfuric acid by distillation at an elevated temperature, in order to evaporate hydrogen fluoride of a desired concentration, in which the aqueous solution of hydrogen fluoride and sulfuric acid is stripped by steam in a separation zone, the released hydrogen fluoride is passed through a drying zone, where it is contacted with a batch of strong sulfuric acid in order to produce hydrogen fluoride of a desired concentration, and the sulfuric acid from the drying zone is fed to the separation zone.

2 Claims, 3 Drawing Figures

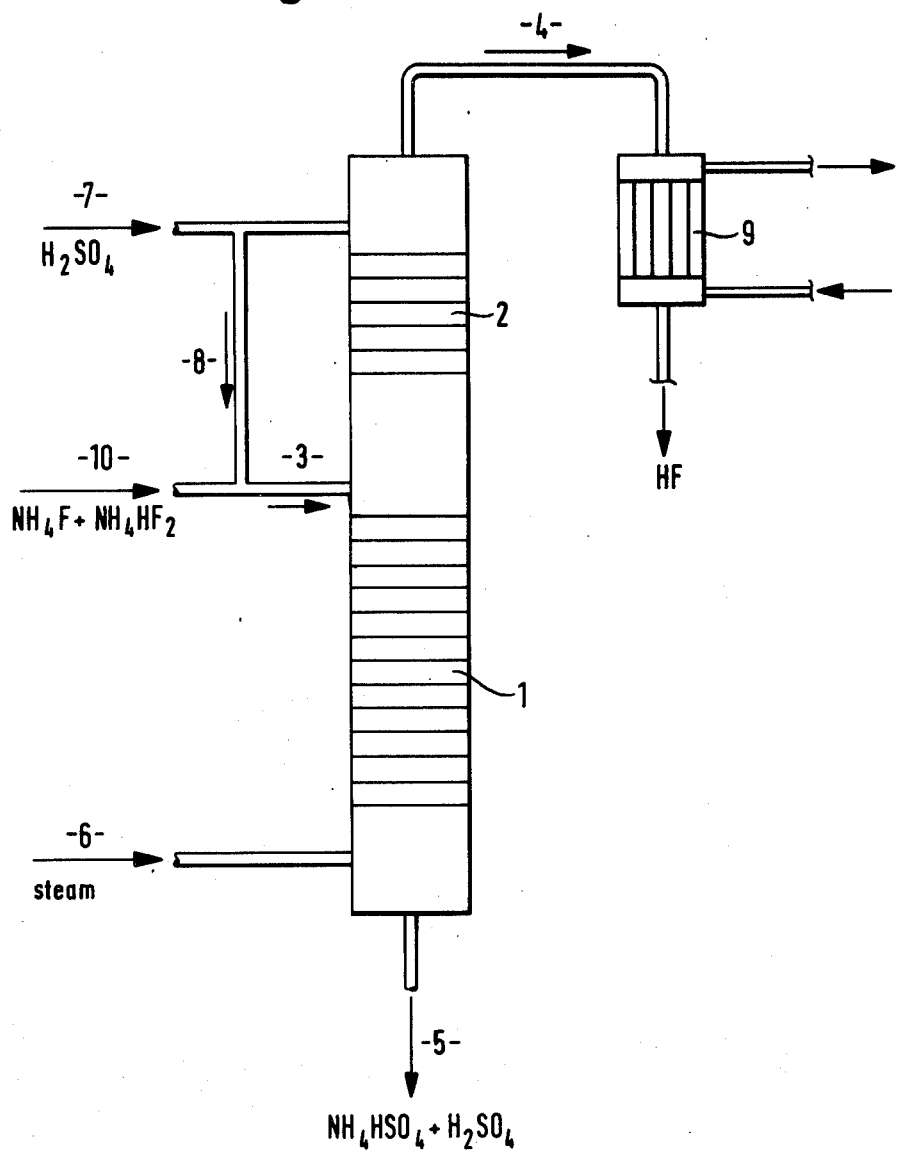

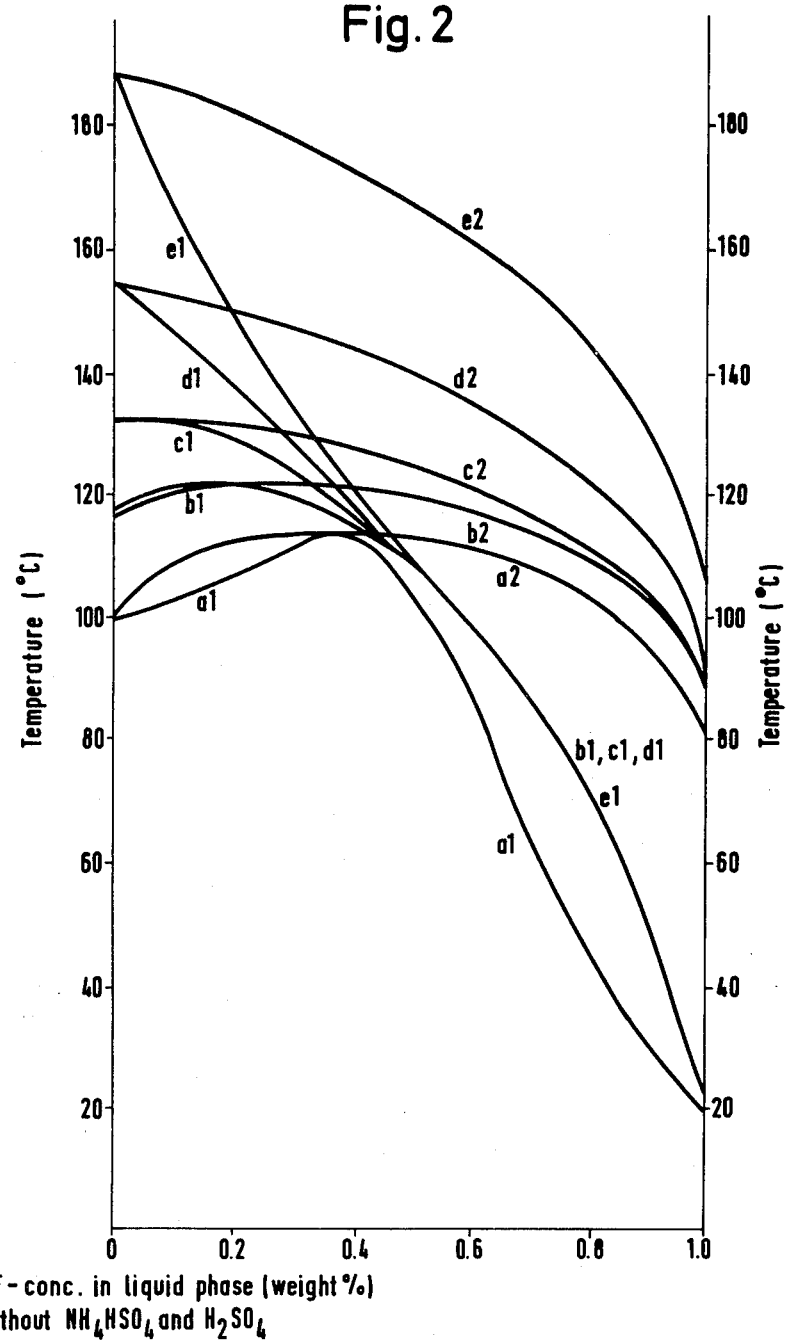

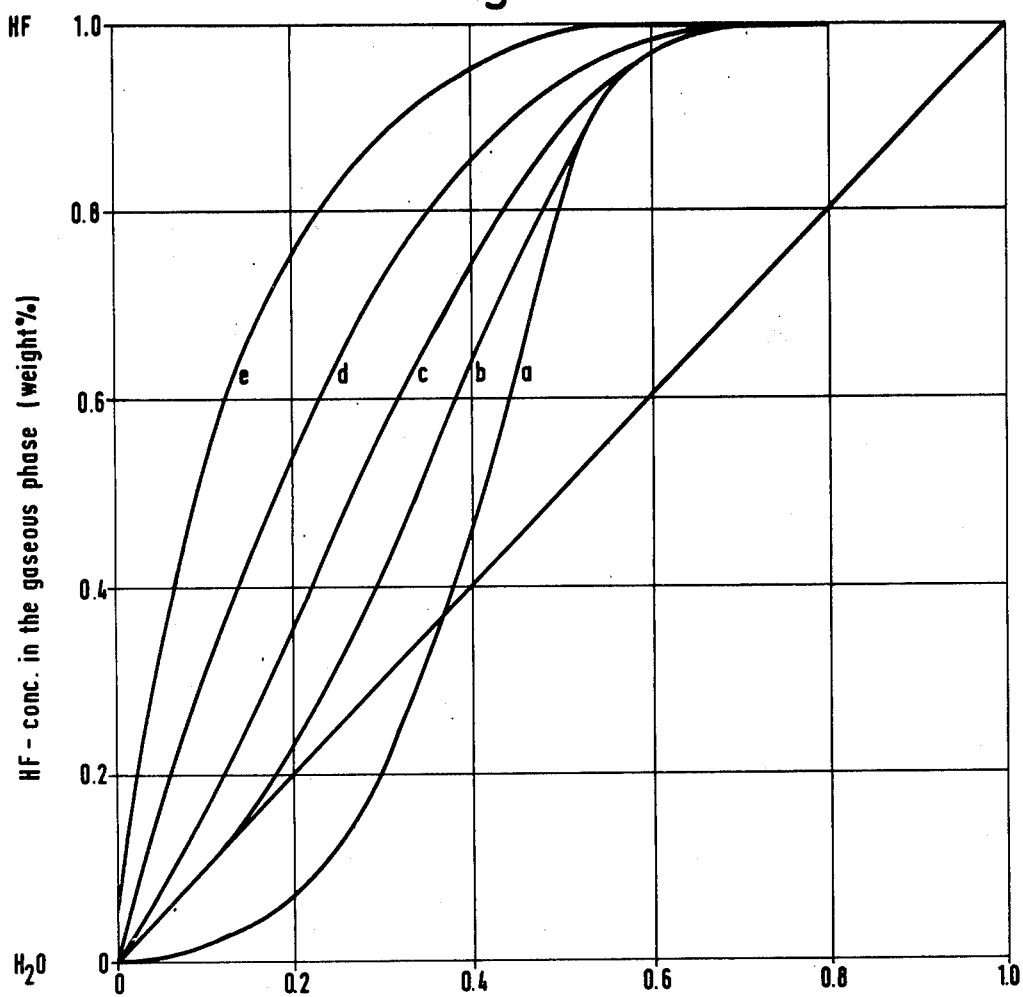

PROCESS FOR PRODUCING HYDROGEN FLUORIDE FROM AN AQUEOUS SOLUTION OF HYDROGEN FLUORIDE AND SULFURIC ACID

BACKGROUND OF THE INVENTION

The present invention relates to a process for producing hydrogen fluoride from an aqueous solution of hydrogen fluoride and sulfuric acid by steam stripping at an elevated temperature in order to vaporize hydrogen fluoride of a desired concentration.

Austrian Pat. No. 236 340 discloses a process for producing hydrogen fluoride by distilling hydrogen fluoride from a mixture of ammonium fluoride and sulfuric acid in a distillation column having 15 theoretical plates. A good yield requires a temperature of 135°–170° C. at the base of the column. Owing to the corroding conditions, only impregnated graphite can be used in the heat exchanger; this is the only material that resists a maximum pressure of 600 kPa and a temperature of 165° C. For this reason, very large and expensive heat exchangers have to be used for a good yield of hydrogen fluoride. The hydrogen fluoride return necessary for obtaining water-free hydrogen fluoride at the top of the column also requires an additional energy feed at the base of the column.

The stripping of hydrogen fluoride by an inert gas from a mixture of sulfuric acid and an aqueous solution of ammonium fluoride and ammonium bifluoride has also been suggested (U.S. Pat. No. 3,455,650). In this case, however, the inert gas flows along with the hydrogen fluoride being stripped, interferes with the condensation of the hydrogen fluoride, and must be separated from it at a subsequent stage. This results in losses of hydrogen fluoride, and a treatment of the outlet gases is required.

Also known is a two-stage process (British Pat. No. 1 060 519) in which solid ammonium fluoride - ammonium bifluoride is mixed with strong sulfuric acid at 150° C., whereby most of the hydrogen fluoride is released, whereafter steam is fed into the mixture and the pressure is reduced in order to release the remaining hydrogen fluoride from the mixture. This process has disadvantages: firstly, the aqueous solution of ammonium fluoride and ammonium bifluoride obtained from the ammoniation of fluorosilicic acid, $H_2SiF_6$, must be evaporated dry in order to produce solid ammonium fluoride - ammonium bifluoride, and secondly, a reduced pressure must be used at the vaporization stage.

The object of the present invention is to provide a less complicated and more economical process for the production of hydrogen fluoride from an aqueous solution of hydrogen fluoride and sulfuric acid by distillation, in order to produce hydrogen fluoride of a desired concentration. By the process according to the invention, it is possible to separate the hydrogen fluoride to such a high degree that its content in the $H_2SO_4$-bearing residual solution is less than 0.1% HF.

SUMMARY OF THE INVENTION

According to the present invention, the aqueous solution containing sulfuric acid and hydrogen fluoride, and possibly a fluoride salt such as ammonium fluoride and ammonium bifluoride, is not evaporated dry but is used as such and mixed with sulfuric acid. Neither is the mixture heated indirectly by pressurized steam, but the mixture is heated by feeding the steam directly into it. The hydrogen fluoride released by the stripping is thereafter passed through the drying zone in the column, where it is contacted with strong sulfuric acid in order to produce hydrogen fluoride of a desired concentration, and the sulfuric acid from the drying is fed into the stripping section of the column.

DESCRIPTION OF THE DRAWINGS

FIG. 1 illustrates a schematic side elevation of a stripping column intended for the application of the process according to the invention;

FIG. 2 illustrates the dependence of the boiling point of the mixture and that of the composition of the steam on the hydrogen fluoride concentration at atmospheric pressure and at different concentrations of free sulfuric acid; and FIG. 3 shows how the amount of free sulfuric acid affects the liquid-vapor equilibrium of the acid mixture being distilled.

DESCRIPTION OF THE PREFERRED EMBODIMENTS

Here the sulfuric acid concentration represents the $H_2SO_4$ amount calculated from the total amount of water plus free sulfuric acid in the solution: $H_2SO_4/(H_2SO_4+H_2O)$.

In FIG. 1, the separation column is indicated by 1 and the drying zone above it by 2. The mixture 3 of the fluorine-bearing aqueous solution 10 and the first batch 8 of sulfuric acid is fed between the separation zone 1 and the drying zone 2. Sulfuric acid (>85% by weight) 7 is also fed into the upper end of the drying zone 2. Simultaneously, steam 6 is fed into the lower end of the separation zone; this steam strips the hydrogen fluoride from the mixture 3 fed into the separation column 1. The released hydrogen fluoride gas flows into the drying zone 2, where it meets the second batch 2 of the over 85-percent sulfuric acid; this sulfuric acid binds the water present in the hydrogen fluoride.

Thus a hydrogen fluoride gas 4 of a desired concentration is obtained from the upper section of the column. This gas is fed into a condenser 9, where the hydrogen fluoride gas condenses. Water-free hydrogen fluoride can thus be obtained without any recycling of hydrogen fluoride. Thus the condenser can be smaller in size, and less steam is required at the base of the column.

The product from the base of the column is sulfuric acid 5 of a concentration of approx. 30–80% by weight. The dilute, hot sulfuric acid solution 5 is cooled and can be used, for example, for the production of phosphoric acid.

If the fluorides are salts, sulfuric acid must be fed into the separation column 1 at least at such a rate that the ammonia present in the over 50-percent salt solution combines to form bisulfate. Thereby the hydrogen fluoride is released and can be stripped using steam.

Any silicon present in the aqueous solution can be removed by adding to the solution some water-soluble potassium salt free of phosphate and chloride, such as a hydroxide, carbonate, sulfate or fluoride of potassium, which is capable of precipitating the residual silicon as potassium silicon fluoride, and the solution substantially devoid of silicon is separated from the precipitate.

The invention is described below in more detail by way of the following examples.

EXAMPLE 1

2850 kg of a 22.7-percent $H_2SiF_6$ solution obtained from the concentration of phosphoric acid is ammoniated by feeding into the solution 180 kg of return ammonia from the evaporator, this ammonia containing 19 kg of water vapor, and 316 kg of ammonia from the vaporizer. The $SiO_2$ separation yields 2984 kg of filtrate and 380 kg of precipitate, which is washed with water at a ratio of 1:1. The washed filtrate is combined with the main filtrate, yielding 3374 kg. This is evaporated and the yield of evaporation product is 1425 kg, its F/N ratio being 1.4 and $H_2O$ content 38%. In the water separation unit, 2300 kg of water condenses from the evaporated gas; the $NH_3$ content in this water is 0.2% and F content 0.06% when 510 kg of steam arrives at the base of the water separation column.

The product of evaporation is fed into the column shown in FIG. 1 together with 2187 kg of 93-percent (by weight) sulfuric acid, and simultaneously 3103 kg of 93-percent (by weight) sulfuric acid is fed into the drying zone. The column is heated by using only steam; 500 kg of steam is fed into the base of the column. Hydrogen fluoride gas 4 is obtained from the column in a practically water-free state. 504 kg of hydrogen fluoride (a 93-percent yield) is obtained from the hydrogen fluoride gas condenser 9; this hydrogen fluoride contains water 0.1–0.2%. The yield of acid 5 from the base of the column is 6711 kg; it contains free sulfuric acid 52% by weight, hydrogen fluoride 0.6% by weight, and ammonium bisulfate 32% by weight.

EXAMPLE 2

The product of evaporation is fed into the column shown in FIG. 1 together with 1500 kg of a 93-percent (by weight) sulfuric acid, and simultaneously 3000 kg of 93-percent (by weight) sulfuric acid is fed into the drying zone 2. The column is heated by using only steam; 387 kg of steam 6 is fed into the base of the column. 75-percent hydrogen fluoride gas 4 is obtained from the column. 766 kg of hydrogen fluoride (a 92-percent yield) containing water 25% is obtained from the hydrogen fluoride gas condenser.

The yield of acid 5 from the base of the column is 5546 kg; it contains sulfuric acid 39% by weight, hydrogen fluoride 0.9% by weight, and ammonium bisulfate 41.7% by weight.

EXAMPLE 3

18142 kg of a dilute solution of sulfuric acid containing sulfuric acid 70% and hydrogen sulfide 3%, the remainder being water, is fed into the column shown in FIG. 1, and simultaneously 8571 kg of 93-percent (by weight) sulfuric acid is fed into the drying zone 2. The column is heated by using only steam; 1600 kg of steam is fed into the base of the column. 516 kg of hydrogen fluoride (a 95-percent yield), containing water 0.1–0.2%, is obtained from the column. 27797 kg of acid is obtained from the base of the column; it contains free sulfuric acid 74% by weight, hydrogen fluoride 0.1% by weight, the remainder being water.

What is claimed is:

1. A process for separating hydrogen fluoride from an aqueous solution of hydrogen fluoride and sulfuric acid, comprising stripping the aqueous solution of hydrogen fluoride and sulfuric acid by steam in a separation zone; passing hydrogen fluoride released in said steam stripping through a drying zone and contacting it in the drying zone with a batch of strong sulfuric acid in order to produce generally water-free hydrogen fluoride of a desired concentration; and passing the sulfuric acid from the drying zone to the separation zone, said steam being absorbed substantially in the sulfuric acid.

2. The process of claim 1, in which the concentration of the sulfuric acid used is at minimum 50% by weight.

* * * * *